United States Patent [19]
Su

[11] Patent Number: 6,041,061
[45] Date of Patent: Mar. 21, 2000

[54] INTERNAL ARBITER FOR A REPEATER IN A COMPUTER NETWORK

[75] Inventor: Ming-Chang Su, Hsinchu, Taiwan

[73] Assignee: Macronix International Co., Ltd., Hsinchu, Taiwan

[21] Appl. No.: 08/794,279

[22] Filed: Jan. 31, 1997

[51] Int. Cl.[7] .................................................. H04L 12/43
[52] U.S. Cl. .......................................... 370/461; 370/462
[58] Field of Search ..................................... 370/246, 247, 370/407, 438, 461, 462, 492, 502, 503, 439, 440

[56] References Cited

U.S. PATENT DOCUMENTS

| | | |
|---|---|---|
| 4,825,435 | 4/1989 | Amundsen et al. . |
| 5,265,123 | 11/1993 | Vijeh et al. . |
| 5,299,195 | 3/1994 | Shah . |
| 5,396,495 | 3/1995 | Moorwood et al. . |
| 5,557,633 | 9/1996 | Staab et al. . |
| 5,740,174 | 4/1998 | Somer ...................................... 370/402 |
| 5,784,648 | 7/1998 | Duckwall ................................ 395/860 |

OTHER PUBLICATIONS

U.S. Patent Application No. 08/503,648 entitled Expandable Integrated Circuit Multiport Repeater Controller with Multiple Media Interfaces and Mixed Media Connections, Filed Jul. 18, 1995, Inventor(s) Liu, et al.

Draft Supplement 1994 IEEE Std. 802.3, "Introduction to 100 Mb/s Baseband Networks", *100BASE–T* pp. 21–1, Oct. 30, 1994 (unapproved draft).

Supplement to ISO/IEC 8802–3: 1993 (ANSI/IEEE Std 802.3, 1993 Edition). IEEE Std. 802.3u, "Repeater for 100 Mb/s Baseband Networks", pp. 203–233, 1995.

*Primary Examiner*—Huy D. Vu
*Assistant Examiner*—Alexander Boakye
*Attorney, Agent, or Firm*—Haynes & Beffel LLP

[57] ABSTRACT

An internal arbiter for a repeater in a computer network regulates access to a common communication channel through which the repeaters communicate with each other. The internal arbiter of the present invention uses a hybrid structure to detect possible contention between repeaters for access to the common communication channel. This hybrid structure combines the fast speed of a system which uses a plurality of dedicated wires (one for each repeater) to broadcast arbitration signals between repeaters, with expandability of a daisy chain interconnection to perform the same function. Additionally, the present invention provides a method for insuring that arbitration inputs are stabilized before they influence arbitration outputs by interposing a delay into the arbitration inputs, and only proceeding to generate arbitration outputs if the input values agree with the delayed input values.

6 Claims, 12 Drawing Sheets

INTERNAL ARBITER FOR A REPEATER IN A COMPUTER NETWORK

BACKGROUND

1. Field of the Invention

The present invention relates to computers and local area networks, and more particularly to an internal arbiter for a repeater in a standard Ethernet type network, which controls access to a common communication channel.

2. Related Art

Repeaters, also referred to as hubs or wiring concentrators, are in widespread use in local area networks. These devices allow interconnection of a number of network segments at the physical layer of the network protocol. Thus, in an Ethernet type network, devices coupled to a single repeater fall within the same collision detect domain for the physical layer of the local area network. See for example, U.S. Pat. No. 5,265,123, entitled EXPANDABLE REPEATER.

A repeater typically contains a number of ports which connect computer systems, thereby connecting the computer systems together through the repeater. Repeaters often connect to other repeaters through a common data channel such as an expansion port, thereby allowing communication between computer systems connected to different repeaters. In such a configuration, arbitration between repeaters is required to ensure that two or more repeaters do not transmit onto the common channel at the same time.

Arbitration can take place at a number of locations. It can take place externally to the repeaters at a centralized location. Or, it can take place internally, inside the repeaters, where each repeater contains a portion of the arbitration mechanism, and the arbitration mechanisms of a connected group of repeaters are coordinated through arbitration signals which are communicated between repeaters.

An external arbiter typically operates synchronously, with all repeaters tied to a common clock. During operation, repeaters send information to the external arbiter, which synchronously determines which repeaters intend to transmit. The centralized arbiter sends commands back to the repeaters, which: allow particular repeaters to transmit; block other repeaters from transmitting; and command other repeaters to transmit "jam patterns" over their general transmitting terminals. External arbitration circuits are implemented in a number of technologies including Programmable Array Logic (PAL), and Transistor-Transistor Logic (TTL).

A centralized external arbiter can be very useful in connecting a limited number of repeaters together. However, as the number of repeaters connected together increases, the number of signals connecting to the external arbiter increases, thereby increasing the number of pins required for a PAL which implements the external arbiter. This increases the cost of the PAL. Also, a centralized external arbiter cannot be easily scaled to accommodate additional repeaters, because if the number of repeaters exceeds the capacity of a particular external arbiter, the entire external arbiter must be replaced with a larger arbiter.

Alternatively, arbitration can take place internally. In one form, a bidirectional asynchronous line connects all repeaters, and each repeater has a unique device number. Before sending data across the communication channel connecting the repeaters together, a repeater transmits its device number across the asynchronous line, and concurrently reads the present device number from the asynchronous line. If these numbers are different, there must exist another repeater which intends to transmit across the communication channel. The repeater stops transmitting its device number to the asynchronous line, and sends "jam patterns" to its general transmitting terminals. If the repeater reads the same number that it sent across the asynchronous line, the repeater knows that it is the only repeater intending to transmit, so the repeater proceeds to transmit data across the communication channel.

Although this asynchronous interconnection scheme requires only a few wires to perform arbitration, the arbitration process is very time consuming. Repeaters must serially transmit their device numbers across the asynchronous line. Furthermore, the clock speed of this device number transmission is potentially very slow because the asynchronous line is bidirectional, and the asynchronous line may be very long if there are a large number of repeaters connected to it.

Alternatively, a daisy chain structure can be used to determine whether contention exists for access to the communication channel. In a daisy chain structure, repeaters are connected together in a linear chain through a sequence of directional daisy chain lines. Each repeater takes an input from a preceding repeater in the chain. This input indicates whether any of the preceding repeaters intend to transmit. If the input is asserted or if the repeater itself intends to transmit, the repeater asserts an output which feeds into the input of the next repeater of the chain. In this way, the daisy chain signal passes through all of the repeaters in the chain, and the signal is asserted when any of the repeaters intend to transmit.

In one embodiment, there are two parallel daisy chain lines connecting repeaters. One runs from the front of the chain to the back of the chain, and the other runs from the back of the chain to the front of the chain. Any repeater in the chain can determine if any other repeater in the chain intends to transmit by examining each of the daisy chain lines. Alternatively, a single daisy chain line runs from the front of the chain to the back of the chain, from where it makes a circular connection around to the front of the chain again.

A daisy chain structure has a number of advantages: it requires only simple interconnections, consisting of one or two lines running through the array; it requires only simple logic elements at each repeater; and it can be expanded to a large number of repeaters. However, a daisy chain structure has disadvantages. Each repeater in a daisy chain introduces at least one gate delay. Consequently, propagation delay through the daisy chain increases as the number of repeaters in the daisy chain increases. This can sharply limit the number of repeaters which can be connected together in a practical system.

Another method for detecting contention is through a "wiring array," which comprises a set of wires running through all of the repeaters. Each repeater connects to its own wire, on which the repeater broadcasts its intention to transmit. A repeater detects whether other repeaters intend to transmit by examining the wires from other repeaters. There is very little propagation delay in this wiring array structure, because each wire runs unimpeded through all of the repeaters in the array, without passing through a logic gate, or other circuitry. Contention detection is therefore very fast. However, connecting large numbers of repeaters in this manner requires a large number of wires running between repeaters. For example, 32 repeaters would require 32 wires. This wiring complexity grows prohibitively large as the number of repeaters increases. Additionally, the number of wires running through repeaters is fixed for a given wiring array implementation, making it impossible to expand a given wiring array past a fixed number of repeaters.

What is needed is a contention detection mechanism which combines the rapid speed of a wiring array structure and the scalability of a daisy chain structure.

SUMMARY

The present invention provides a method and apparatus for performing arbitration between repeaters in a computer network without using a centralized arbiter. The method and apparatus combines the modularity and scalability of a daisy chain structure with the rapid speed of a wiring array. The operates by dividing an array of repeaters into a plurality of subarrays each of which is interconnected through a wiring array. Subarrays are connected together through daisy chain interconnections to form a single array connecting all repeaters.

Additionally, the present invention provides a method and apparatus for ensuring arbitration inputs are stabilized. This method and apparatus operates by channeling the arbitration inputs, or alternatively the intermediate signals generated from the arbitration inputs, through delay elements. Arbitration outputs are asserted only if the inputs of the delay elements match the outputs of the delay elements. This helps to ensure that the arbitration inputs are stabilized before they affect the arbitration outputs. The invention further provides for an adjustable delay, so that the time delay between input and output of the above-mentioned delay elements can be changed. Finally, the present invention can be selectively bypassed to allow an external arbiter to perform the arbitration.

Accordingly, the present invention provides a scalable, modular internal arbitration circuit for repeaters in a computer network combining the rapid speed of a wiring array structure with the scalability of a daisy chain structure. Other aspects and advantages of the present invention will be evident upon review of the figures, the detailed description, and the claims which follow.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown but is to be accorded the widest scope consistent with the principles and features disclosed herein.

Figure 1:
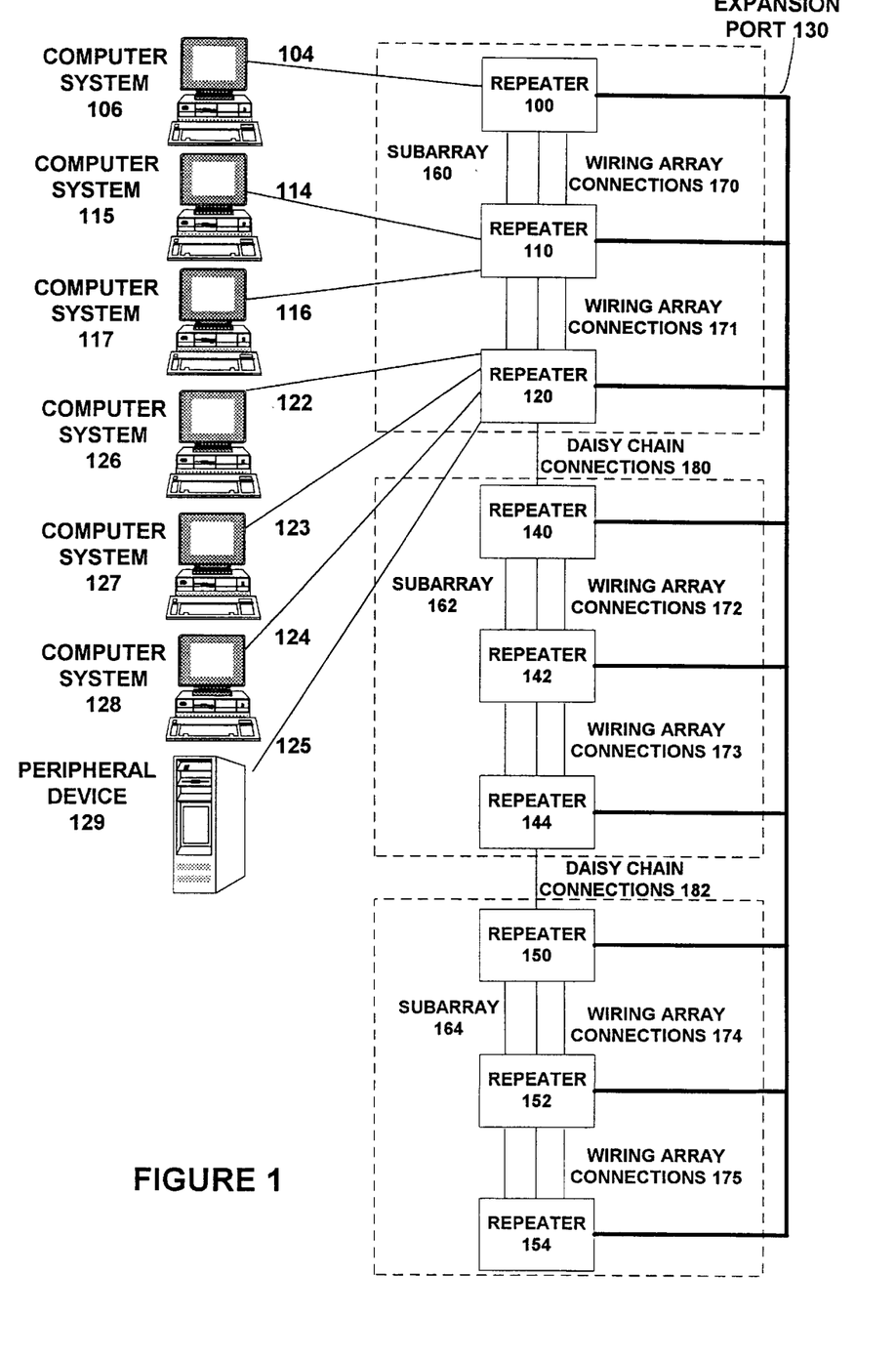
FIG. 1 is a diagram showing how a plurality of computer systems and a peripheral device are connected through repeaters, and how repeaters connect with each other through arbitration signals in a hybrid wiring array and daisy chain interconnection scheme in accordance with an aspect of the present invention.

FIG. 1 is a diagram showing how repeaters are used to connect a number of network segments together, and further how repeaters connect to each other through arbitration signals in a hybrid wiring array and daisy chain interconnection scheme in accordance with one embodiment of the present invention. Repeaters 100, 110, 120, 140, 142, 144, 150, 152, and 154 comprise an array of repeaters, all of which connect to expansion port 130, which functions as a common communication channel through which repeaters 100, 110, 120, 140, 142, 144, 150, 152, and 154 communicate with each other. Repeaters 100, 110, 120, 140, 142, 144, 150, 152, and 154 additionally connect to each other through arbitration signals, including wiring array connections 170, 171, 172, 173, 174 and 175, as well as daisy chain connections 180 and 182. These connections define subarrays 160, 162 and 164, wherein: subarray 160 contains repeaters 100, 110 and 120; subarray 162 contains repeaters 140, 142 and 144; and subarray 164 contains repeaters 150, 152 and 154. Within each subarray, repeaters are connected to each other through a set of wired array connections which include a dedicated output line for each repeater, so that each repeater can directly broadcast arbitration signals to all other repeaters in the same subarray.

Subarrays 160, 162 and 164 connect to each other through daisy chain connections 180 and 182. These daisy chain connections comprise at least one directional signal line which transfers arbitration information between subarrays. In particular, subarray 160 connects to subarray 162 through daisy chain interconnections 180, and subarray 162 connects to subarray 164 through daisy chain interconnections 182, FIG. 1. illustrates repeaters 100, 110 and 120 connect to computers and a peripheral device for subarray 160 only. Subarrays 162 and 164 additionally connect to respective computer systems and peripheral devices. However, these connections are not shown in FIG. 1. Within subarray 160, repeaters 100, 110 and 120 connect to computer systems 106,115,117,126,127 and 128, and a peripheral device 129. These computer systems 106, 115, 117, 126, 127 and 128, and peripheral device 129 connect to the general transmitting and receiving terminals of the repeaters 100, 110, and 120. In particular, computer system 106 connects to repeater 100 through linkage 104. Computer systems a 115 and 117 connect to repeater 110 through linkages 114 and 116, respectively. Computer system 126 connects to repeater 120 through linkage 122. Computer system 127 connects to repeater 120 through linkage 123. Computer system 128 connects to repeater 120 through linkage 124. Finally, peripheral device 129 connects to repeater 120 through linkage 125. Although FIG. 1 shows repeaters connecting only computer systems and a peripheral device together, repeaters can generally be used to interconnect any devices which can be connected through a computer network.

The present invention allows computer systems to communicate with computer systems which are connected to other repeaters. For example, in order for computer system 106 to transmit data to computer system 128, computer system 106 first transfers the data to repeater 100 across linkage 104. Repeater 100 then transmits the data across expansion port 130 to repeater 120. Finally, repeater 120 transmits the data across linkage 124 to computer system 128. Computer systems can also communicate with computer systems connected to repeaters from other subarrays. However, this type of communication is described at a later point in the instant specification.

Figure 2:
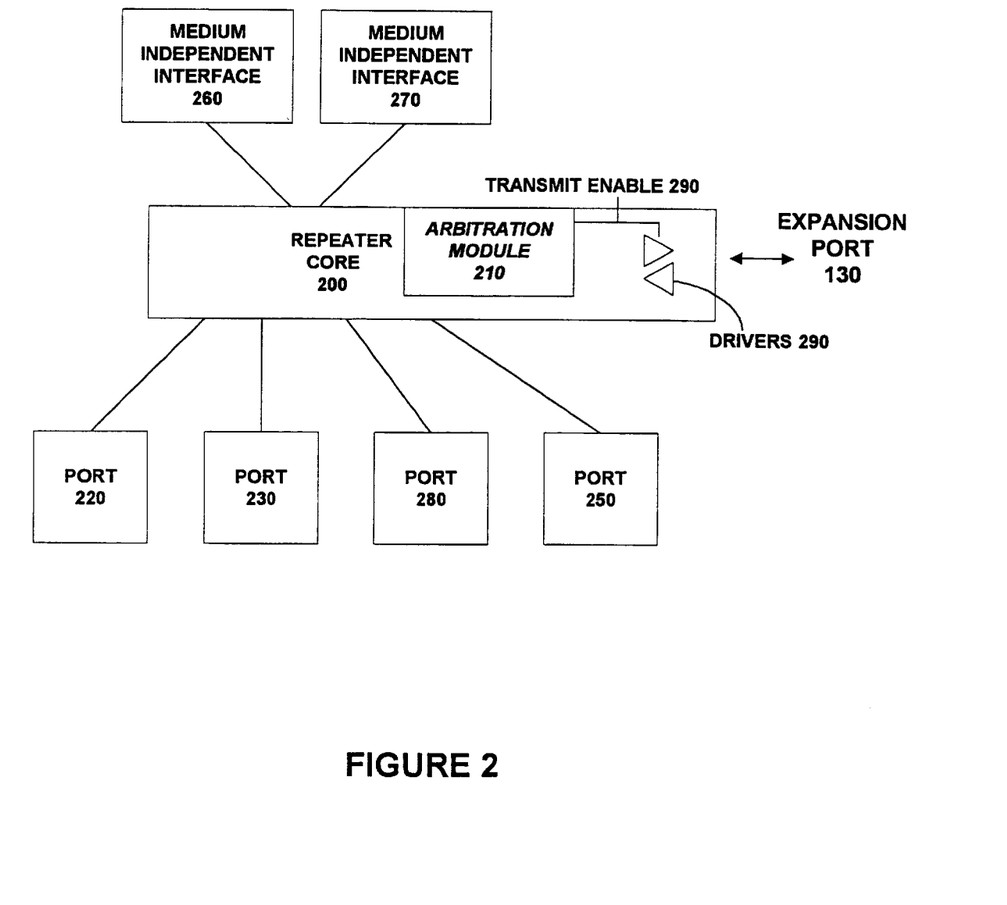
FIG. 2 is a block diagram showing the major functional components of a repeater in accordance with an aspect of a present invention.

FIG. 2 is a block diagram of the major functional components of repeater 100 in accordance with an embodiment of the present invention. Repeater 100 includes a number of medium independent interfaces 260, 270, and a number of ports 220, 230, 250, and 280, which connect to repeater core 200. See Institute for Electrical and Electronic Engineers standard 802.3 u for a more detailed explanation of medium independent interfaces, ports, and the repeater core. Expansion port 130 connects to repeater core 200 through drivers 290, which are controlled by transmit enable signal 280 originating from arbitration module 210.

Figure 3:
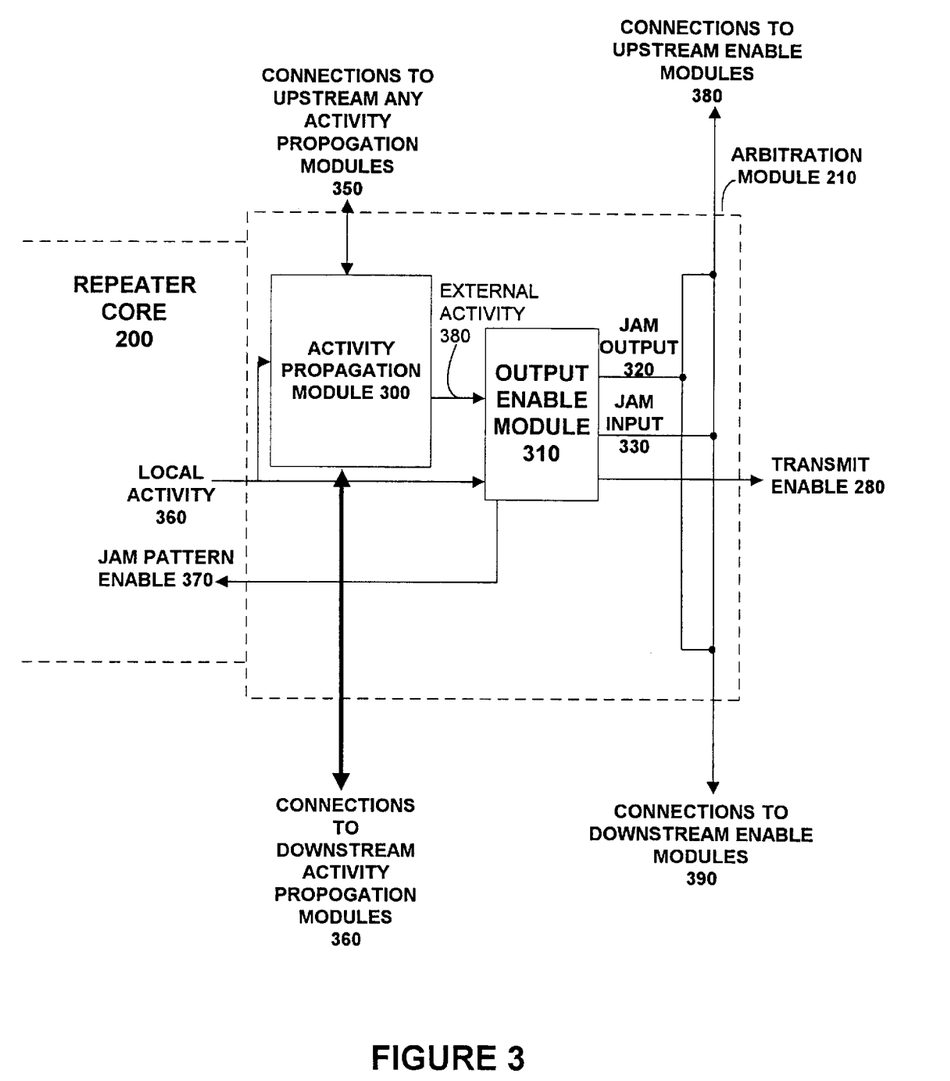
FIG. 3 is a block diagram showing the major functional components of, as well as the inputs and outputs of, an internal arbitration module contained within a repeater in accordance with an aspect of the present invention.

FIG. 3 is a block diagram illustrating the major functional components as well as the inputs and outputs of arbitration module 210 from FIG. 2. As can be seen from FIG. 2, arbitration module 210 resides next to repeater core 200 within repeater 100. Referring back to FIG. 3, arbitration module 210 takes in local activity signal 360 as well as input signals from: connections to upstream propagation modules 350, connections to downstream activity propagation modules 360, connections to upstream enable modules 380 and connections to downstream enable modules 390. Arbitration module 210 uses these input signals to generate transmit enable signal 280, as well as outputs which feed into: connections to upstream activity propagation modules 350, connections to downstream activity propagation modules 360, connections to upstream enable modules 380 and connections to downstream enable modules 390.

Arbitration module 210 comprises two main functional components: (1) activity propagation module 300, and (2) output enable module 310. Activity propagation module 300 takes local activity signal 360 as an input as well as inputs from connections to upstream activity propagation modules 350, and connections to downstream activity propagation modules 360. Activity propagation module 300 uses these inputs to generate external activity signal 380 which feeds into output enable module 310. Activity propagation module 300 additionally generates outputs that feed into connections to upstream activity propagation modules 350, and connections to downstream activity propagation modules 360.

Output enable module 310 takes as inputs external activity signal 380, local activity signal 360, and jam input signal 330. It uses these signals to generate a number of outputs, including: transmit enable signal 280, which enables transmission by repeater 100 across expansion port 130; jam pattern enable signal 370, which feeds back into repeater core 200 and enables the transmission of jam patterns over the general transmitting terminals of repeater 100; and jam output signal 320 which is propagated to upstream output enable modules through connections to upstream enable modules 380, and to downstream output enable modules through connections to downstream enable modules 390.

Figure 4:
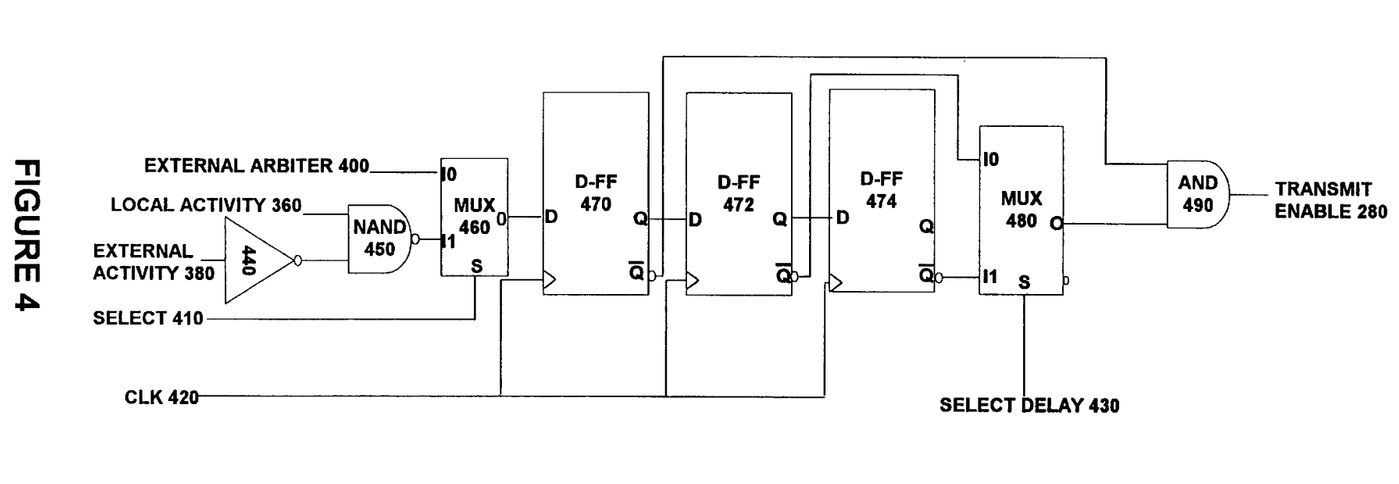
FIG. 4 is a circuit diagram illustrating how an internal arbitration module generates a transmit enable signal for enabling transmission by a repeater onto a common communication channel connecting repeaters in accordance with an aspect of the present invention.

FIG. 4 illustrates the portion of output enable module 310 which generates transmit enable signal 280 according to one embodiment of the present invention. External activity signal 380 feeds into the input of inverter 440, the output of which feeds into an input of NAND gate 450. NAND gate 450 takes an additional input from local activity signal 360, and uses these two inputs to form an output which feeds into an input of multiplexer (MUX) 460. MUX 460 takes an additional input from external arbiter signal 400, as well as an input from select signal 410. Select signal 410 determines whether MUX 460 switches external arbiter signal 400, or the output of NAND gate 450 onto the output of MUX 460. MUX 460 allows locally generated arbitration signals, from local activity signal 360 and external activity signal 380, to be bypassed and replaced with external arbiter signal 400, from an external arbitration circuit.

The output of MUX 460 feeds into the input of D-flip flop 470 (D-FF). The output of D-FF 470 feeds into the input of D-FF 472. The output of D-FF 472 feeds into the input of D-FF 474. Clock signal 420 feeds into the clock inputs of D-FFs 470, 472 and 474. MUX 480 takes as inputs the inverted output of D-FF 472 and the inverted output of D-FF 474 and selectively connects these onto the output of MUX 480. Select delay signal 430 determines whether the output of D-FF 472 or the output of D-FF 474 appears on the output of MUX 480. AND gate 490 takes an input from the inverted output of D-FF 470, and an input from the output of MUX 480. AND gate 490 uses these two inputs to generate transmit enable signal 280 at its output, which enables transmission by repeater 100 across expansion port 130.

MUX 480 controls the delay through D-FFs 472 and 474. If the output of D-FF 474 is selected, a signal originating from D-FF 470 first passes through D-FF 472 and then D-FF 474 before appearing at the input of AND gate 490. This introduces a delay of approximately two clock pulses between the output of D-FF 470 and the output of D-FF 474. If MUX 480 selects the output of D-FF 472, there is only a one clock pulse delay between the output of D-FF 470 an the output of D-FF 472. In this way, select delay signal 470 can be used to select a one clock pulse or a two clock pulse delay between signals appearing on the inputs of AND gate 490.

Figure 5:
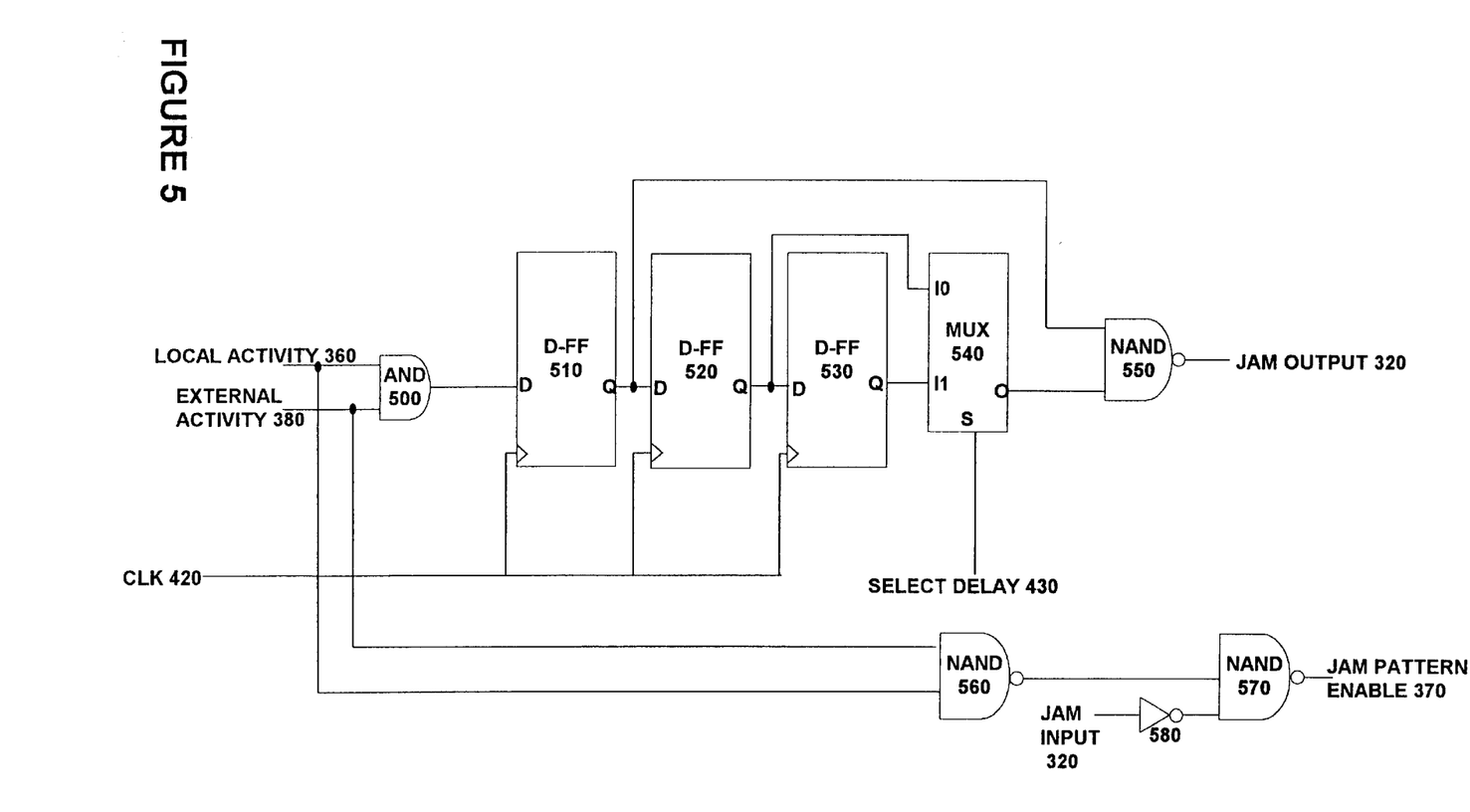
FIG. 5 is a circuit diagram for an internal arbitration module of a given repeater which generates a signal indicating that both the given repeater and other repeaters intend to transmit across the common communication channel connecting repeaters in accordance with an aspect of the present invention.

FIG. 5 illustrates the portion of the internal circuitry of output enable module 310, which generates jam pattern enable signal 370, and jam output 320 according to one embodiment of the present invention. Jam output 320 is generated as follows. Local activity signal 360 and external activity signal 380 feed into inputs of AND gate 500. The output of AND gate 500 feeds into the input of D-FF 510. The output of D-FF 510 feeds into the input of D-FF 520. The output of D-FF 520 feeds into the input of D-FF 530. The output of D-FF 530 feeds into one of two inputs to MUX 540. Clock signal 420 feeds into the clock inputs of D-FFs 510, 520 and 530. The other input of MUX 540 is the output of D-FF 520. Select delay signal 430 determines whether the output of D-FF 520 or the output of D-FF 530 is switched onto the output of MUX 540. The output of MUX 540 feeds into an input of NAND gate 550, which takes a further input from the output of D-FF 510. The output of NAND gate 550 connects to jam output 320.

MUX 540 is used to select a delay between the two inputs to NAND gate 550. The output of MUX 540 is either the output of D-FF 520, which is one clock pulse delayed from the output of D-FF 510, or the output of D-FF 530, which is two clock pulses delayed from the output of D-FF 510. In this way, there is either a one clock pulse or a two clock pulse delay between inputs to NAND gate 550.

The output of NAND gate 550 is jam output 320, which feeds through connections to upstream enable modules 380, and connections to downstream enable modules 390 into the jam inputs of other repeater modules, causing the other repeater modules to transmit jam patterns to their general transmitting terminals.

Jam pattern enable signal 370 is generated as follows. NAND gate 560 takes inputs from local activity signal 360 and external activity signal 380. The output of NAND gate 560 feeds into an input of NAND gate 570, which takes a further input from inverter 580, which inverts jam input 320. The output of NAND gate 570 is jam pattern enable signal 370. Jam pattern enable signal 370 connects into the repeater core 200 of repeater 100, where it enables transmission of jam patterns to the general transmitting terminals of repeater 100. Jam pattern enable signal 370 will be asserted if both local activity signal 360 and external activity signal 380 are both asserted, or if jam input 320 is asserted.

Figure 6:
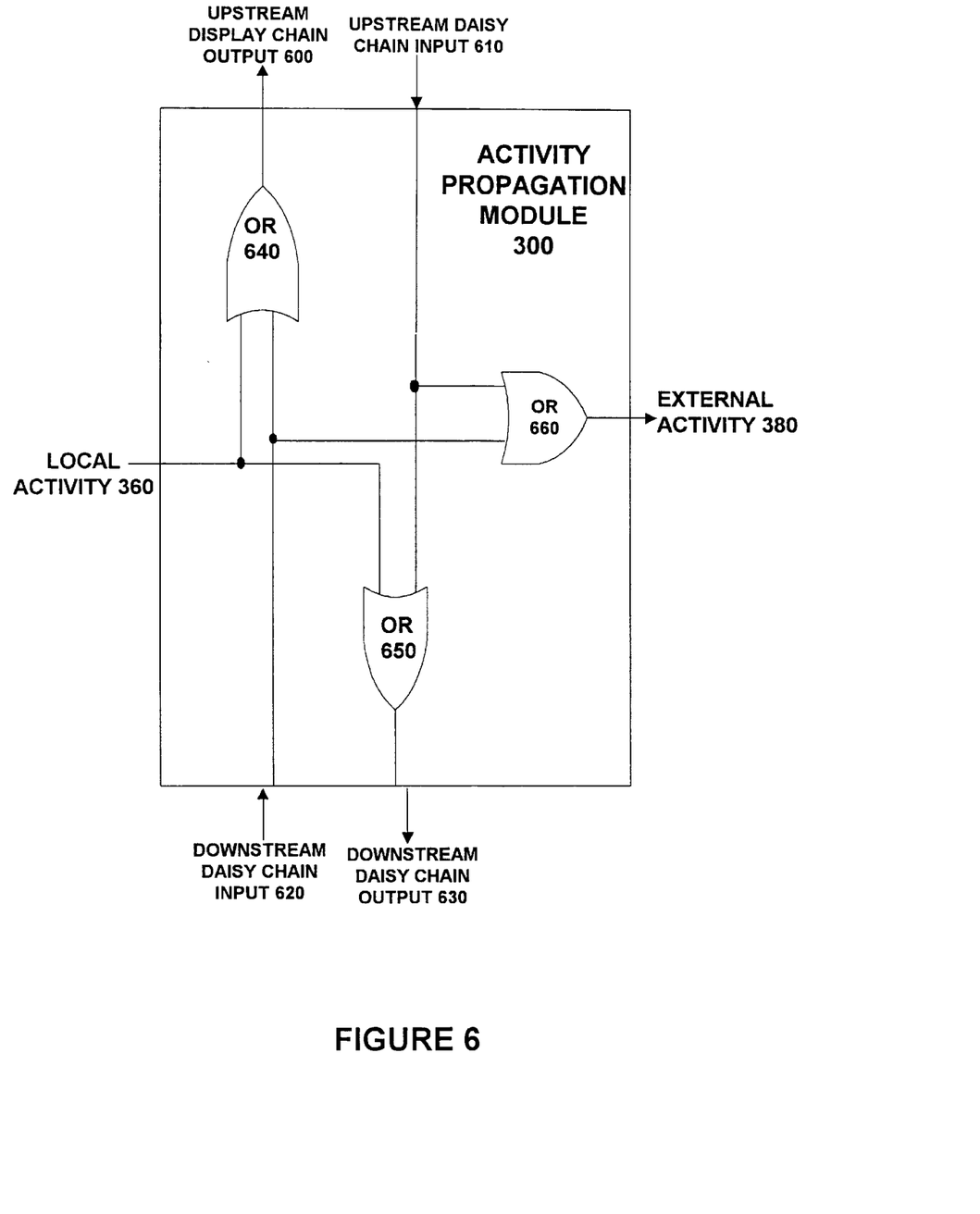
FIG. 6 is a circuit diagram of a daisy chain module for detecting whether other repeaters intend to transmit in accordance with an aspect of the present invention.

FIG. 6 illustrates an embodiment of activity propagation module 300, which uses a daisy chain structure to detect activity on other repeaters. This embodiment has a number of inputs, including: local activity signal 360, which indicates that local repeater 100 intends to transmit across expansion port 130; upstream daisy chain input 610, which indicates that at least one upstream repeater intends to transmit; and downstream daisy chain input 620, which indicates that at least one downstream repeater intends to transmit.

OR gate 640 takes in local activity signal 360, and downstream daisy chain input signal 320, and generates upstream daisy chain output 600. This is asserted if either local activity signal 360, or downstream daisy chain input 620 is asserted. Upstream daisy chain output 600 indicates to upstream repeaters that either downstream repeaters intend to transmit, or local repeater 100 intends to transmit.

OR gate 650 takes as inputs local activity signals 360, and upstream daisy chain input 610, and generates downstream daisy chain output 650, which indicates that either an upstream repeater intends to transmit, or local repeater 100 intends to transmit.

Finally, OR gate 660 takes as inputs downstream daisy chain input 620, and upstream daisy chain input 610 and generates external activity signal 380, which is asserted when either upstream daisy chain input 610 is asserted or downstream daisy chain input 620 is asserted. External activity signal 380 indicates that another repeater in the daisy chain intends to transmit.

Figure 7:
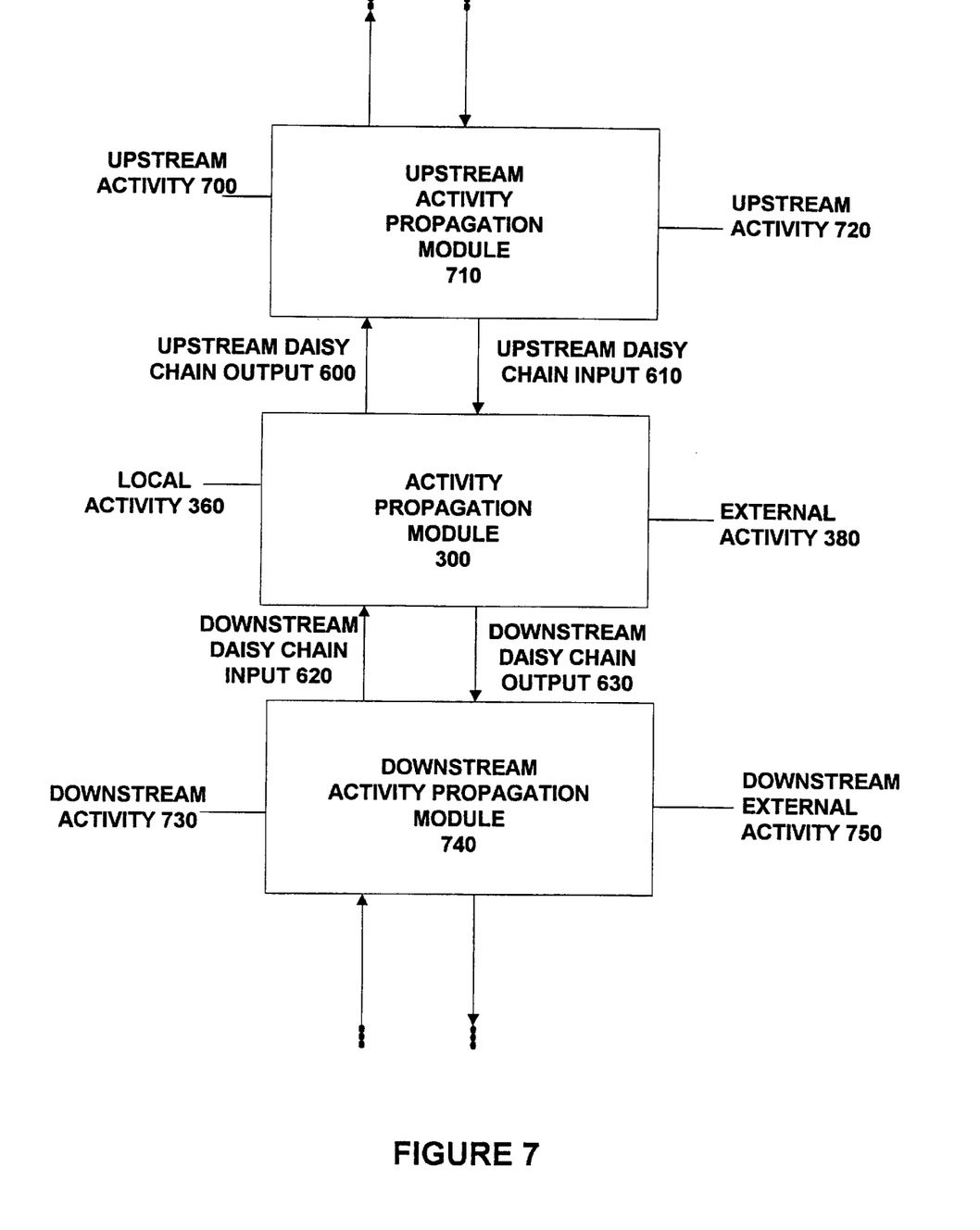
FIG. 7 illustrates how the daisy chain modules illustrated in FIG. 6 are linked together in accordance with an aspect of the present invention.

FIG. 7 illustrates how activity propagation modules, which use a daisy chain structure such as pictured in FIG. 6, are connected together to form a daisy chain of activity propagation modules. Activity propagation module 300 takes in local activity signal 360 and outputs external activity signal 380. Activity propagation module 300 further connects to upstream activity propagation module 710 through upstream daisy chain output 600, and upstream daisy chain input 610. Upstream propagation module 710 takes in upstream activity signal 700 and outputs upstream external activity signal 720. Activity propagation module 300 connects to downstream activity propagation module 740 through downstream daisy chain input 620 and downstream daisy chain output 630. Downstream activity propagation module 740 takes in downstream activity signal 730 and outputs downstream external activity signal 750. Although only three propagation modules are illustrated in the daisy chain of FIG. 7, a daisy chain of activity propagation modules can be extended to greater lengths. The only constraint is that propagation delay through the daisy chain increases as additional modules are added to the chain.

Figure 8:
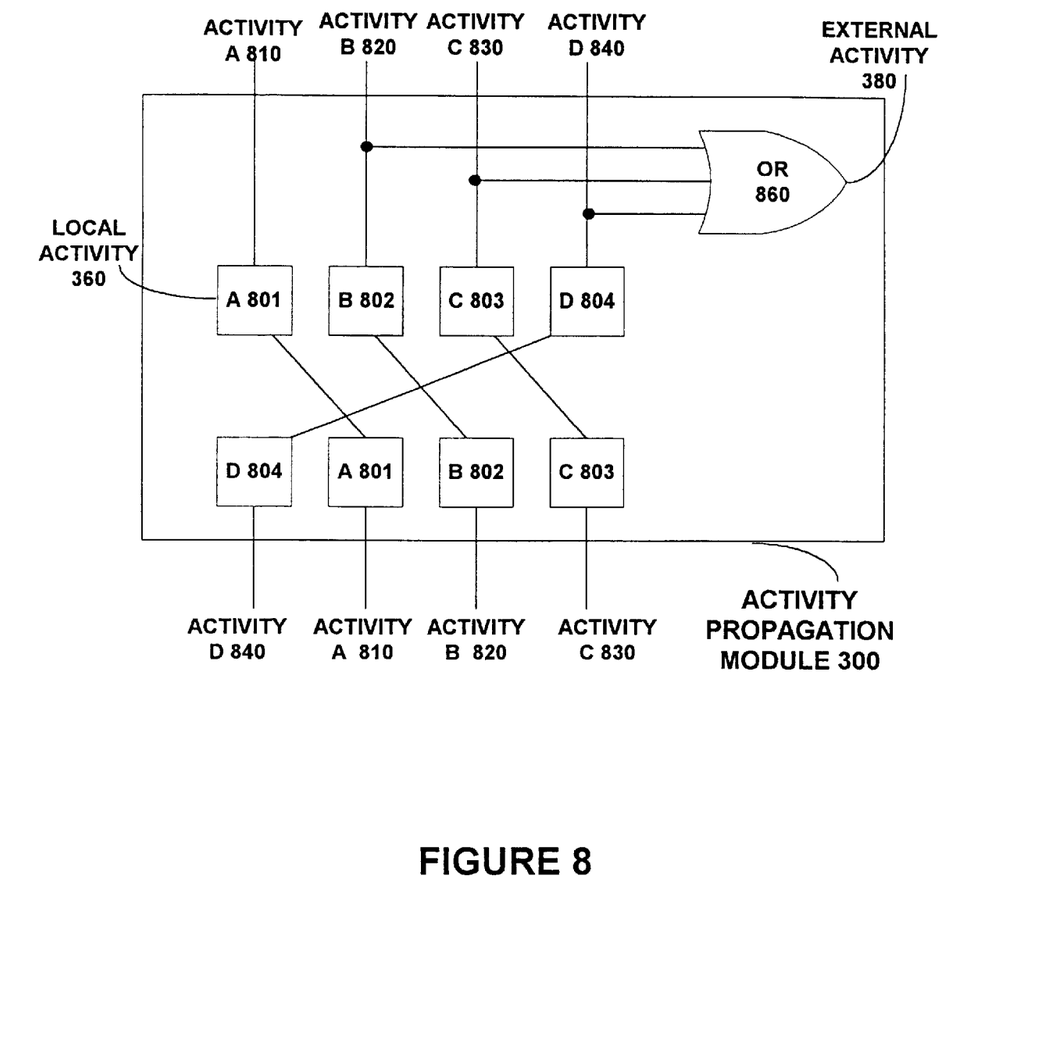
FIG. 8 is a circuit diagram for a module which uses a wiring array to determine whether other repeaters intend to transmit across a common communication channel connecting repeaters in accordance with an aspect of the present invention.

FIG. 8 is a diagram of the internal structure of activity propagation module 300, which uses a wiring array to detect whether other modules intend to transmit in accordance with one embodiment of the present invention. Local activity signal 360 feeds into activity propagation module 300, which generates external activity signal 380. A number of activity signals pass through activity propagation module 300, including activity A signal 810, activity B signal 820, activity C signal 830 and activity D signal 840. These activity signals pass through activity propagation module 300 without passing through any logic gates. Hence, there is very little propagation delay across the activity lines.

In this embodiment, activity signals are cyclically rotated from input to output of activity propagation module 300. In this way, the local activity signal from each repeater can connect to its own activity signal line, while at the same time maintaining a uniform structure for each activity propagation module.

External activity signal 380 is generated at OR gate 860 which takes in inputs from activity B signal 820, activity C signal 830 and activity D signal 840. OR gate 860 uses these inputs to generate external activity signal 380, which is asserted if activity B signal 820, activity C signal 830 or activity D signal 840 is asserted.

Figure 9:
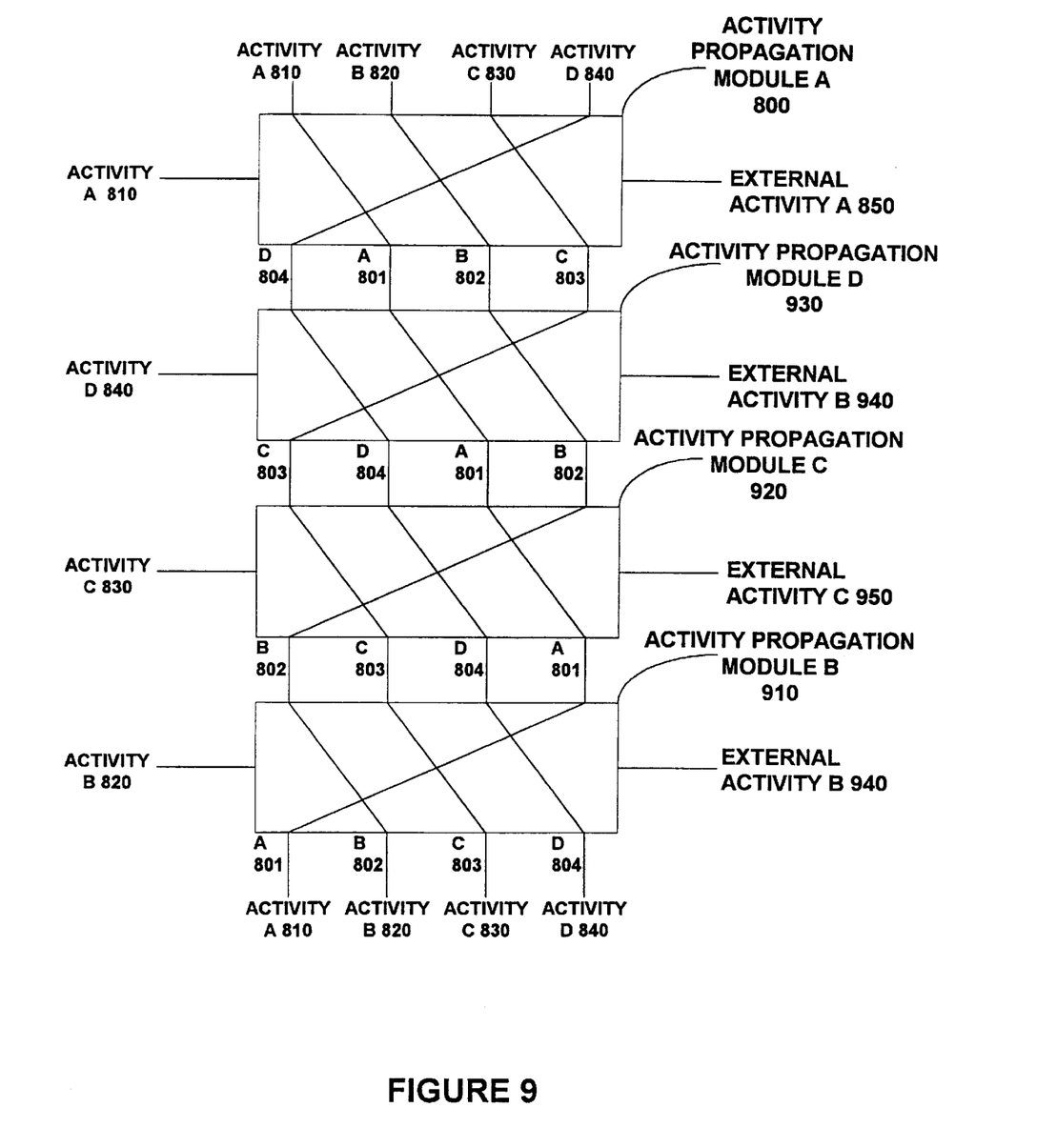
FIG. 9 illustrates how the modules illustrated in FIG. 8 can be linked together to form a wiring array in accordance with an aspect of the present invention.

FIG. 9 illustrates how an array of activity propagation modules as illustrated in FIG. 8 is connected together. Activity propagation module A 800 takes in activity A signal 810 as an input and outputs external activity A signal 850. Activity propagation module B 910 takes in activity B signal 820 as an input and outputs external activity B signal 940. Activity propagation module C 920 takes in activity C signal 830 as an input and outputs external activity C signal 950. Activity propagation module D 930 takes in activity D signal 840 as an input and outputs external activity D signal 960. The above-mentioned activity propagation modules are connected together by activity A signal 810, activity B signal 820, activity C signal 830 and activity D signal 840. As can be seen from FIG. 9, each module rotates the activity signals on its inputs one position right before placing the signals on its outputs, so that a different activity signal occupies the first position in each module in the array. This allows all modules to have the same wiring structure, while allowing each module to connect to its own activity signal. After passing through all four modules 800, 910, 920 and 930, activity signals 810, 820, 830 and 840 are rotated back to their original positions.

Figure 10:
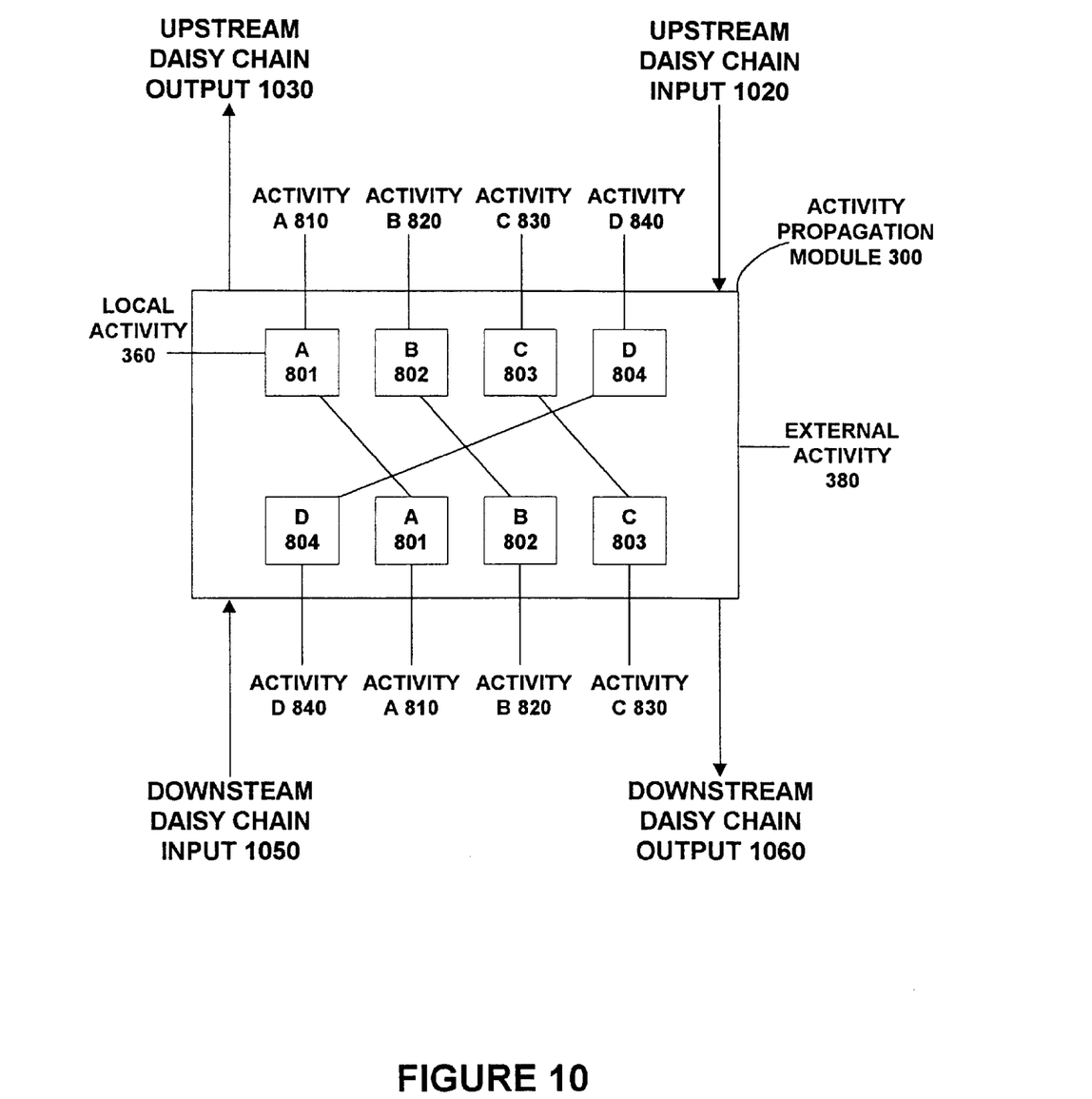
FIG. 10 is a block diagram of a hybrid daisy chain and wiring array module for detecting whether other repeaters intend to transmit across a common communication channel connecting repeaters in accordance with an aspect of the present invention.

FIG. 10 illustrates yet another embodiment of activity propagation module 300 in accordance with the present invention. This embodiment uses a hybrid daisy chain and wiring array structure to detect whether other repeaters intend to transmit across expansion port 130. According to this embodiment, activity propagation module 300 takes in local activity signal 360 as an input and outputs external activity signal 380. Activity propagation module 300 includes a set of activity signals as inputs including: activity A signal 810, activity B signal 820, activity C signal 830 and activity D signal 840. These activity signals are rotated one position to the right before appearing as activity outputs. Hybrid activity propagation module 300 includes a number of daisy chain connections, including: upstream daisy chain input 1020, downstream daisy chain input 1050, upstream daisy chain output 1030 and downstream daisy chain output 1060.

Figure 11:
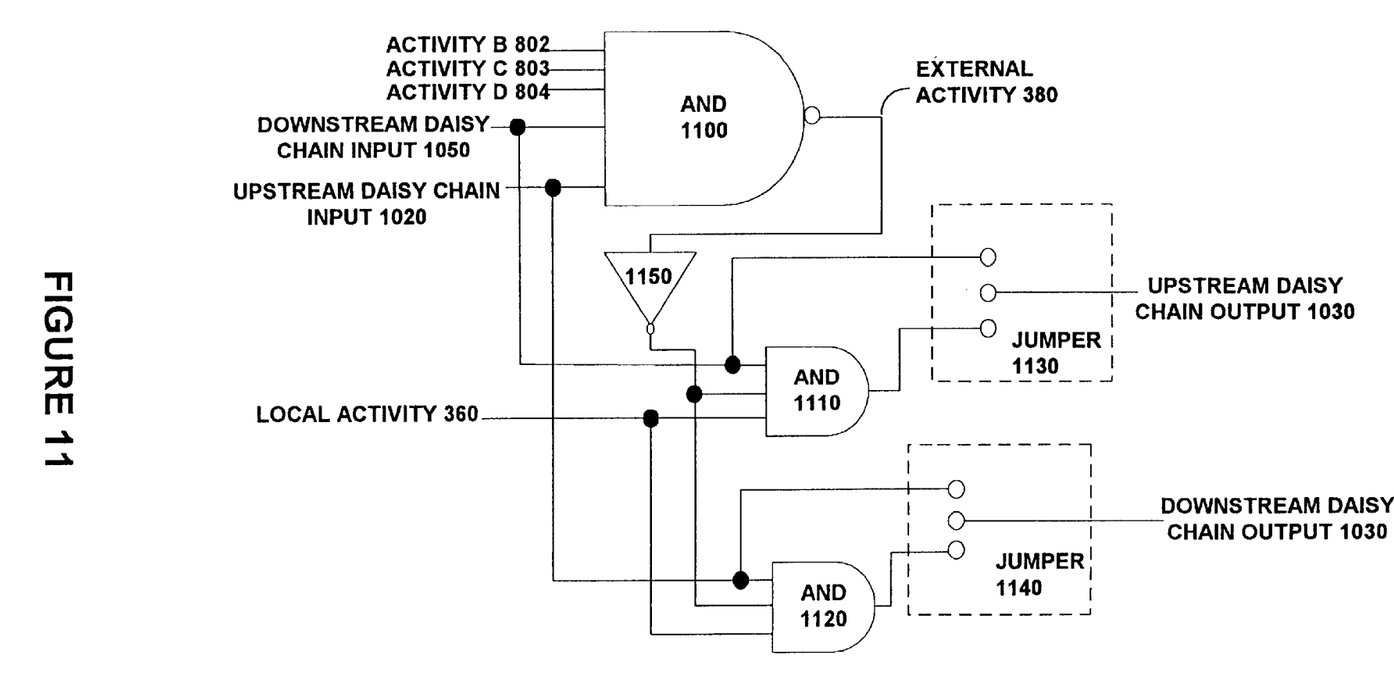
FIG. 11 is a circuit diagram showing the internal wiring of the hybrid daisy chain and wiring array module of FIG. 10 in accordance with an aspect of the present invention.

FIG. 11 is a schematic diagram of the internal structure of the activity propagation module 300 of FIG. 10. NAND gate 1100 takes as inputs activity B signal 820, activity C signal 830, activity D signal 840, downstream daisy chain input 1050 and upstream daisy chain input 1020. It uses these inputs to generate external activity signal 380 which is asserted low whenever any one of the above-mentioned inputs to NAND gate 1100 is asserted low. External activity signal 380 feeds into inverter 1150 to produce an inverted external activity signal which is asserted high. This inverted external activity signal feeds into an input of AND gate 1110, which also takes inputs from downstream daisy chain input 1050 and local activity signal 360. AND gate 1110 generates an output which feeds through jumper 1130 to upstream daisy chain output 1030. Jumper 1130 also connects directly to downstream daisy chain input 1050, and can be used to selectively switch either the output of AND gate 1110, or downstream daisy chain input 1050 onto upstream daisy chain output 1030. This allows the downstream daisy chain input 1050 to bypass activity propagation module 300, and pass directly through to upstream daisy chain output 1030.

Similarly, AND gate 1120 takes inverted external activity signal 380 as an input, along with upstream daisy chain input 1020 and local activity signal 360. The output of AND gate 1120 feeds through jumper 1140 to downstream daisy chain output 1030. Jumper 1140 also connects to upstream daisy chain input 1020, thereby allowing downstream daisy chain output 1030 to be selectively switched between upstream daisy chain input 1020, and the output of AND gate 1120. This allows upstream daisy chain input 1020 to be directly gated onto downstream daisy chain output 1030, thereby bypassing activity propagation module 300.

Figure 12:
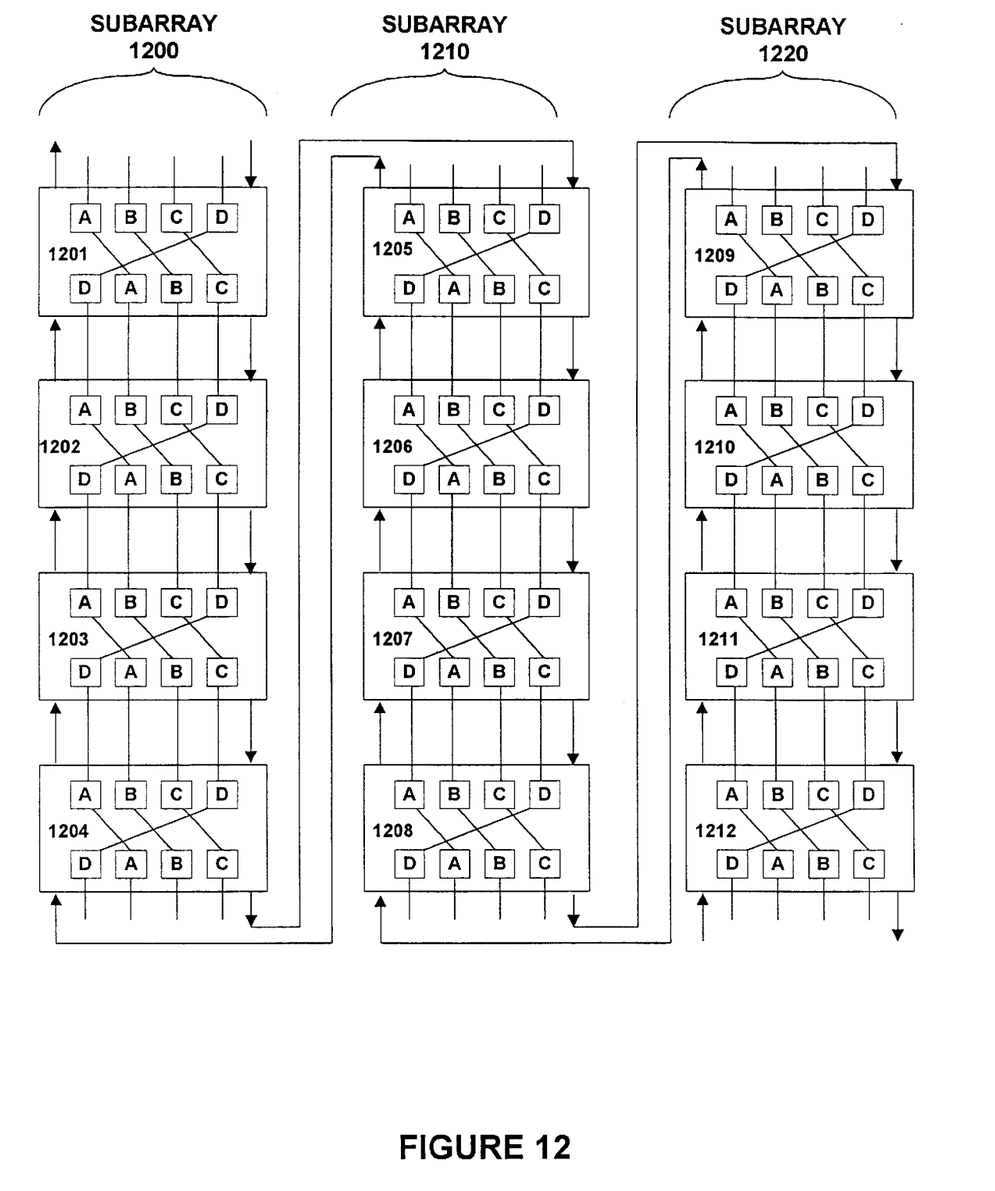
FIG. 12 illustrates how the hybrid modules illustrated in FIG. 10 and FIG. 11 are connected together through a wiring array to form sub-arrays, which are daisy chained together to form an array of hybrid modules in accordance with an aspect of the present invention.

FIG. 12 illustrates how a group of hybrid activity propagation modules, such as the one illustrated in FIGS. 10 and 11, are connected to form an array. The array in FIG. 12 is composed of a number of subarrays 1200, 1210 and 1220. Hybrid activity propagation modules 1201, 1202, 1203 and 1204 are connected together through activity inputs and activity outputs as well as daisy chain inputs and daisy chain outputs to form subarray 1200. Hybrid activity propagation modules 1205, 1206, 1207 and 1208 are connected together through activity inputs and activity outputs as well as daisy chain inputs and daisy chain outputs to form subarray 1210. Hybrid activity propagation modules 1209, 1210, 1211 and 1212, are connected together through activity inputs and activity outputs and daisy chain inputs and daisy chain outputs to form subarray 1220. In each of the subarrays 1200, 1210 and 1220, the activity input and activity output signals are linked together. Because there are no gate delays on these activity signal lines, activity signals propagate rapidly through each subarray. Subarrays 1200, 1210, and 1220, are connected together through daisy chain inputs and daisy chain outputs, but not through activity inputs and activity outputs.

The embodiment of the present invention pictured in FIGS. 10, 11 and 12 has only four activity signals: 810, 820, 830 and 840. This allows groups of up to four repeaters to be connected together through wiring array interconnections. Other embodiments use different numbers of activity signals. For example, according to another embodiment, each module has ten activity signals, which can be used to connect repeaters into subarrays of up to ten repeaters through wiring array interconnections.

According to another aspect of the present invention, hybrid activity propagation modules 1201 to 1212 in FIG. 12 are connected slightly differently. The activity outputs of hybrid activity propagation module 1204 are connected to the activity inputs of hybrid activity propagation module 1205, and the activity outputs of hybrid activity propagation module 1208 are connected to the activity inputs of hybrid activity propagation module 1209. Furthermore, each of modules 1201 through 1212 are internally structured so that when jumpers 1130 and 1140 are configured to bypass local activity signal 360, the wiring array connections will be activitated, and when jumpers 1130 and 1140 are configured to include local activity signal 360, the wiring array connections will be disabled. This interconnection method allows greater flexiblity in dividing hybrid activity propagation modules 1201 to 1212 into subarrays. With the aid of jumper switches 1130 and 1140, one can configure the whole system into various subarray combinations. Note that subarrays need not be of equal size.

According to another aspect of the present invention, software controlled switches are used in place of jumpers 1130 and 1140, to allow the system configuration to take place under software control.

The hybrid daisy chain and wiring array interconnection structure illustrated in FIGS. 10, 11 and 12 has a number of advantages over a purely daisy chain or a purely wired array structure. Signals propagate rapidly through each subarray, so signal propagation through the hybrid array is much faster than a purely daisy chain structure with the same number of activity propagation modules. Unlike a purely wired array structure, which requires one additional wire for each additional activity propagation module, the hybrid interconnection structure can be easily expanded by adding additional subarrays. The hybrid structure therefore has a significant advantage in signal propagation speed over a purely daisy chain structure and a significant advantage in scalability over a purely wired array structure.

Example of Transmission Enablement

Assume that a plurality of repeaters is connected together including repeater 100. Further assume that repeater 100 desires to transmit over expansion port 130, and that no other repeater intends to transmit over expansion port 130. Referring to FIG. 4, local activity signal 360 is asserted because repeater 100 desires to transmit, and external activity signal 380 is not asserted because no other repeater intends to transmit. External activity signal 380 feeds through inverter 440, which feeds into an input of NAND gate 450. Consequently, both inputs to NAND gate 450 are asserted causing the output of NAND gate 450 to be asserted low. Further assume select signal 410 is set to a high value so that the output of NAND gate 450 feeds into the input of D-FF 470. After one cycle of clock 420, the asserted low value from NAND gate 450 is clocked into D-FF 470, where it appears on the output of D-FF 470, and then feeds into the input of D-FF 472. On the next clock cycle, this input is clocked into D-FF 472, and appears on the output of D-FF 472 shortly thereafter. Further, assume that select delay signal 430 is set to a low value so that the inverted output of D-FF 472 feeds through MUX 480 into the input of AND gate 490. Shortly after the second clock cycle, both inputs to AND gate 490 are asserted, causing the output of AND gate 490, which is transmit enable signal 280, to be asserted high. Transmit enable signal 280 feeds back into repeater core 200 of repeater 100 enabling transmission of data from repeater 100 across expansion port 130.

Referring to FIG. 5, local activity signal 360 which feeds into AND gate 500 is also asserted. However, external activity signal 380 which also feeds into AND gate 500 is not asserted. Consequently, the output of AND gate 500 is not asserted and neither jam output 320, nor jam pattern enable 370 is subsequently asserted.

Example of Conflict Detection

Referring to FIG. 12, assume that the repeaters corresponding to activity propagation modules 1201 and 1212 intend to transmit at the same time. Referring to FIG. 3, local activity signal 360 for each of modules 1201 and 1212 is asserted and feeds into activity propagation module 300 at each of modules 1201 and 1212. Local activity signal 360 for activity propagation module 1201 is carried over an activity line through modules 1202, 1203 and 1204. Similarly, local activity signal 360 at module 1212 is carried over an activity line through modules 1209, 1210 and 1211. Next, signals from subarray 1200 propagate through daisy chain outputs to subarray 1210, across subarray 1210, and then through a daisy chain output of subarray 1210 to subarray 1220. Similarly, a signal from subarray 1220 propagates across a daisy chain output of subarray 1220 to subarray 1210, across subarray 1210, and then through a daisy chain output of subarray 1210 to sub-array 1200. Note that daisy chain signals from module 1205 in subarray 1210 bypass modules 1206 and 1207 before arriving at module 1208. This is accomplished by setting jumpers 1130 and 1140 (see FIG. 11) of modules 1206 and 1207 so that the daisy chain signals bypass interior modules 1206 and 1207 of subarray 1210. In this way, the daisy chain signal is not impeded by additional gate delays as it traverses from one end of a subarray 1210 to the other end of subarray 1210.

Eventually, the signals propagate into the external activity signal 380 at each of modules 1201 and 1212. Examining module 1201, both local activity signal 360 and external activity signal 380 are asserted. External activity signal 380 passes through inverter 440 into an input of NAND gate 450. NAND gate 450 takes its other input from local activity signal 360. Because external activity signal 380 has been asserted, the output of inverter 440 will assume a low value, and consequently, one of the inputs to NAND gate 450 will have a low value. Therefore, the output of NAND gate 450 will not be asserted. Assume select signal 410 is a high value so that the output of NAND gate 450 feeds into the input of D-FF 470. Because the input to D-FF 470 is not asserted, transmit enable signal 280, which is asserted when the inputs to AND gate 490 are both asserted, will never be asserted. Therefore, the repeaters corresponding to modules 1201 and 1212 will not transmit across expansion port 130.

Referring to FIG. 5, recall that local activity signal 360 is asserted and external activity signal 380 is asserted. These both feed into AND gate 500, causing the output to AND gate 500 to be asserted. The output of AND gate 500 feeds into the input of D-FF 510, and on the next clock cycle is loaded in D-FF 510, where shortly thereafter it appears at the output of D-FF 510. The output of D-FF 510 feeds into the input of D-FF 520. Consequently, on the next clock cycle, this asserted input will be loaded into D-FF 520, causing the output to D-FF 520 to be asserted shortly thereafter. Assume select delay signal 430 is at a low value so that the output of D-FF 520 is gated into the input of NAND gate 550. After two clock cycles, NAND gate 550 has two asserted inputs, causing the output of NAND gate 550 to be asserted. This feeds into jam output 320, which (referring to FIG. 3) is transmitted through connections to upstream enable modules 380 and connections to downstream modules 390 to the jam inputs of other arbitration modules.

The circuitry in FIG. 5 generates jam pattern enable signal 370 as follows. Local activity signal 360 and external activity signal 380 feed into inputs of NAND gate 560 where they caused the output of NAND gate 560 to be asserted low. This feeds into an input of NAND gate 570 which causes jam pattern enable signal 370 to be asserted. Referring to FIG. 3, jam pattern enable signal 370 feeds back into repeater core 200 where it enables the transmission of jam patterns across the general transmitting terminals of repeaters 1201 and 1212.

Other repeaters besides the ones associated with modules 1201 and 1212 will receive an asserted jam input 320 from the repeaters associated with modules 1201 and 1212. Referring to FIG. 5, jam input 320 feeds through inverter 580 into an input of NAND gate 570, causing the output of NAND gate 570 to be asserted, thereby causing jam pattern enable signal 370 to be asserted high. This causes other repeaters, besides the repeaters associated with module 1201 and 1212, to transmit jam signals.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in the art.

What is claimed is:

1. An internal arbitration module for a repeater in a computer network, comprising:

a plurality of activity inputs, including a local activity input, indicating activity on a local repeater, and other activity inputs, indicating activity on other repeaters;

a plurality of activity outputs, wherein each activity output is coupled to a corresponding activity input;

at least one daisy chain input;

at least one daisy chain output, which is asserted when any of said at least one daisy chain input and said plurality of activity inputs are asserted; and an external activity output, indicating activity on external repeaters, which is asserted when any of said at least one daisy chain input and other activity inputs are asserted.

2. The internal arbitration module for a repeater in a computer network of claim 1, wherein said at least one daisy chain input includes an upstream daisy chain input and a downstream daisy chain input; and said at least one daisy chain output includes an upstream daisy chain output and a downstream daisy chain output;

wherein said upstream daisy chain input is asserted when any of said downstream daisy chain input and said plurality of activity inputs are asserted; and wherein said downstream daisy chain output is asserted when any of said upstream daisy chain input and said plurality of activity inputs are asserted.

3. The internal arbitration module for a repeater in a computer network of claim 1, wherein:

said plurality of activity inputs includes a first activity input, a second activity input, a second to last activity input and a last activity input;

said plurality of activity outputs includes a first activity output, a second activity output, a third activity output and a last activity output; wherein said first activity input is coupled to said second activity output;

said second activity input is coupled to said third activity output;

said second to last activity input is coupled to said last activity output; and said last activity input is coupled to said first activity output.

4. The internal arbitration module for a repeater in a computer network of claim 1, further comprising at least one bypass switch connecting said at least one daisy chain input directly to said at least one daisy chain output.

5. An array of repeaters in a computer network, comprising:

a plurality of repeaters, wherein each repeater includes an arbitration module, and wherein said arbitration module connects to at least one other arbitration module in another repeater, and wherein each arbitration module comprises:

a plurality of activity inputs, including a local activity input, indicating activity on a local repeater, and other activity inputs, indicating activity on other repeaters;

a plurality of activity outputs, wherein each activity output is coupled to a corresponding activity input;

at least one daisy chain input;

at least one daisy chain output, which is asserted when any of said at least one daisy chain input and said plurality of activity inputs are asserted; and an external activity output, indicating activity on external repeaters, which is asserted when any of said at least one daisy chain input and other activity inputs are asserted.

6. The array repeaters in a computer network of claim 5, wherein said array repeaters is arranged into a plurality of subarrays, each of which comprises a plurality of repeaters connected together through said plurality of activity inputs and said plurality of activity outputs of arbitration modules within said plurality of repeaters in each subarray; and wherein said plurality of subarrays are connected to each other through said at least one daisy chain input and at least one daisy chain output of at least one arbitration module of said plurality of repeaters in each subarray.

* * * * *